United States Patent
Nishiyama

(10) Patent No.: US 7,522,386 B2
(45) Date of Patent: Apr. 21, 2009

(54) CPP THIN-FILM MAGNETIC HEAD HAVING AUXILIARY CONDUCTIVE LAYER BEHIND ELEMENT

(75) Inventor: Yoshihiro Nishiyama, Tokyo (JP)

(73) Assignee: TDK Corporation, Tokyo (JP)

( * ) Notice: Subject to any disclaimer, the term of this patent is extended or adjusted under 35 U.S.C. 154(b) by 385 days.

(21) Appl. No.: 11/136,033

(22) Filed: May 24, 2005

(65) Prior Publication Data

US 2005/0264946 A1 Dec. 1, 2005

(30) Foreign Application Priority Data

May 31, 2004 (JP) .............................. 2004-161958

(51) Int. Cl.
*G11B 5/33* (2006.01)
*G11B 5/127* (2006.01)
(52) U.S. Cl. ........................................ 360/319; 360/322
(58) Field of Classification Search .................. 360/319, 360/322, 324–324.2
See application file for complete search history.

(56) References Cited

U.S. PATENT DOCUMENTS

| | | | |
|---|---|---|---|
| 5,872,691 A * | 2/1999 | Fukuyama et al. | 360/319 |
| 6,538,856 B1 * | 3/2003 | Gill | 360/319 |
| 6,671,133 B1 * | 12/2003 | Sasaki | 360/317 |
| 6,819,530 B2 * | 11/2004 | Gill | 360/314 |
| 2004/0057162 A1 * | 3/2004 | Gill | 360/314 |
| 2005/0264947 A1 * | 12/2005 | Nishiyama | 360/319 |
| 2007/0127132 A1 * | 6/2007 | Lissotschenko et al. | 359/629 |
| 2007/0127157 A1 * | 6/2007 | Nishiyama et al. | 360/126 |
| 2007/0127163 A1 * | 6/2007 | Nishiyama et al. | 360/319 |

FOREIGN PATENT DOCUMENTS

JP   A1 2002-150518   5/2002

* cited by examiner

*Primary Examiner*—Brian E Miller
(74) *Attorney, Agent, or Firm*—Brinks Hofer Gilson & Lione

(57) ABSTRACT

A CPP thin-film magnetic head includes lower and upper shield layers separated by a predetermined distance and a thin-film magnetic head element disposed therebetween. Current flows in a direction orthogonal to the surface of the thin-film magnetic head element. The CPP thin-film magnetic head further includes an insulating layer positioned at the rear of the thin-film magnetic head element in a height direction and covering the thin-film magnetic head element and the lower shield layer, a first nonmagnetic metal layer provided in a region defined by the insulating layer, and a second nonmagnetic metal layer disposed between the upper shield layer and the first nonmagnetic metal layer, the insulating layer, and the thin-film magnetic head element. The second nonmagnetic metal layer allows current to flow from the upper shield layer to the thin-film magnetic head element through the first nonmagnetic metal layer.

11 Claims, 4 Drawing Sheets

FIG. 4
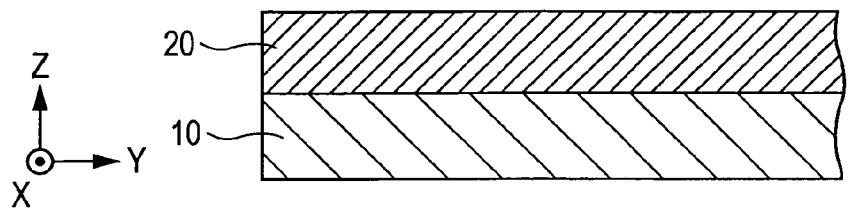
FIG. 5A
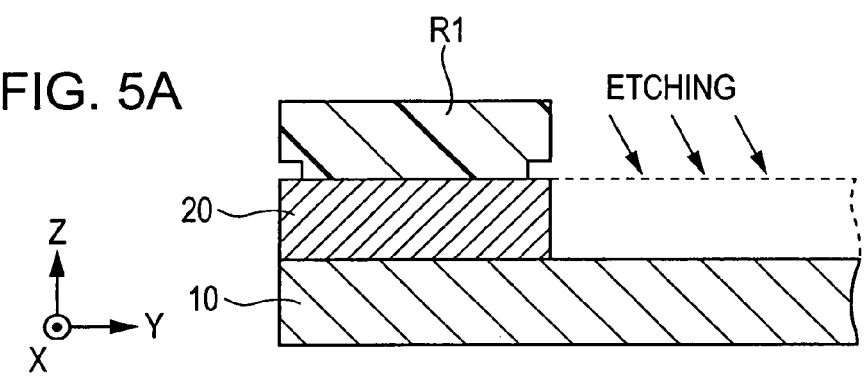
FIG. 5B
FIG. 6
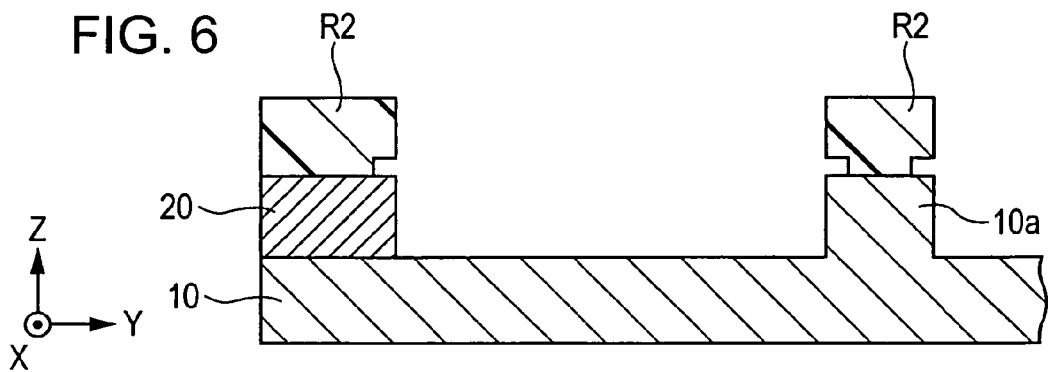

CPP THIN-FILM MAGNETIC HEAD HAVING AUXILIARY CONDUCTIVE LAYER BEHIND ELEMENT

This application claims the benefit of priority to Japanese Patent Application No. 2004-161958 filed on May 31, 2004, herein incorporated by reference.

BACKGROUND OF THE INVENTION

1. Field of the Invention

The present invention relates to current-perpendicular-to-plane (CPP) thin-film magnetic heads, which allow sense current to flow in a film-thickness direction (a direction orthogonal to a film surface).

2. Description of the Related Art

Giant magnetoresistive (GMR) elements and tunneling magnetoresistive (TMR) elements for use as thin-film magnetic head elements are broadly divided into current-in-plane (CIP) elements and current-perpendicular-to-plane (CPP) elements. CIP elements allow sense current to flow in parallel with the surfaces of individual layers constituting the elements, while CPP elements allow sense current to flow in a direction perpendicular to the surfaces of the individual layers constituting the elements.

FIG. 12 is a sectional view of the structure of a known CPP thin-film magnetic head. This CPP thin-film magnetic head includes a lower shield layer 110, an upper shield layer 130 formed at a predetermined shield distance R-GL from the lower shield layer 110, a thin-film magnetic head element 120 formed between the shield layers 110 and 130 and exposed at a surface of the head facing a recording medium, and an insulating layer 140 formed between the shield layers 110 and 130 at the rear of the thin-film magnetic head element 120 in a height direction. The upper shield layer 130 is separated into a first upper shield layer segment 131 positioned above the thin-film magnetic head element 120 and a second upper shield layer segment 132 positioned at the rear of the thin-film magnetic head element 120 in the height direction. The second upper shield layer segment 132 is electrically connected to the lower shield layer 110 through a contact hole 141 provided in the insulating layer 140. The first upper shield layer segment 131 and the thin-film magnetic head element 120 are separated by a nonmagnetic metal layer 151, while the second upper shield layer segment 132 and the lower shield layer 110 are separated by another nonmagnetic metal layer 152. These nonmagnetic metal layers 151 and 152 are made of a nonmagnetic metal material with lower specific resistance than the shield layers 110 and 130. Shield seed layers (not shown in the drawings) are formed beneath the shield layers 110 and 130.

Sense current I flows from the first upper shield layer segment 131 to the second upper shield layer segment 132 through the nonmagnetic metal layer 151, the thin-film magnetic head element 120, the lower shield layer 110, and the nonmagnetic metal layer 152. Alternatively, the sense current I flows from the second upper shield layer segment 132 to the first upper shield layer segment 131 through the nonmagnetic metal layer 152, the lower shield layer 110, the thin-film magnetic head element 120, and the nonmagnetic metal layer 151.

An example of such a known CPP thin-film magnetic head is disclosed in Japanese Unexamined Patent Application Publication No. 2002-150518.

In the head structure described above, however, the insulating layer 140 at the rear of the thin-film magnetic head element 120 in the height direction has a large thickness, namely about 50 nm, in order to prevent a short between the shield layers 110 and 130. The insulating layer 140 therefore obstructs the dissipation of heat generated from the thin-film magnetic head element 120 and the shield layers 110 and 130, thus impairing heat dissipation properties.

In the above head structure, as is well known, the shield layers 110 and 130 are made of a soft magnetic material such as NiFe. When, therefore, the sense current I flows through the shield layers 110 and 130, they cause an anisotropic magnetoresistance (AMR) effect. This effect decreases the resistance of the shield layers 110 and 130, and thus causes noises in the output of the thin-film magnetic head element 120. In particular, the current density is higher in regions where the sense current I enters or exits the shield layers 110 and 130. In these regions, therefore, the AMR effect generates a larger amount of noise. The noise due to the AMR effect can be reduced by forming the shield layers 110 and 130 with a shield material having a smaller AMR effect. Such a shield material, however, cannot produce a sufficient magnetic shield effect. Alternatively, the current flowing through the shield layers 110 and 130 can be reduced by increasing the thicknesses of the nonmagnetic metal layers 151 and 152. The increased thicknesses, however, result in a longer shield distance R-GL between the shield layers 110 and 130, and therefore make it difficult to reduce the shield distance R-GL.

SUMMARY OF THE INVENTION

An object of the present invention in light of the above problems is to provide a CPP thin-film magnetic head with higher heat dissipation properties and a lower amount of noise due to an AMR effect by shield layers to achieve a shorter shield distance.

The present invention focuses on the points that the heat dissipation properties can be improved by providing a thinner insulating layer at the rear of a thin-film magnetic head element in a height direction, that the sense current flowing through an upper shield layer can be reduced by providing a current bypass of nonmagnetic metal material between the upper shield layer and the thin-film magnetic head element, and that the optimum region for the current bypass is the inside of the insulating layer disposed at the rear of the thin-film magnetic head element in the height direction.

Specifically, the present invention provides a CPP thin-film magnetic head including a lower shield layer, an upper shield layer separated from the lower shield layer by a predetermined distance, and a thin-film magnetic head element disposed between the lower and upper shield layers. Current flows in a direction orthogonal to the surface of the thin-film magnetic head element. This CPP thin-film magnetic head further includes an insulating layer positioned at the rear of the thin-film magnetic head element in a height direction and covering the thin-film magnetic head element and the lower shield layer, a first nonmagnetic metal layer provided in a region defined by the insulating layer, and a second nonmagnetic metal layer disposed between the upper shield layer and the first nonmagnetic metal layer, the insulating layer, and the thin-film magnetic head element. The second nonmagnetic metal layer allows current to flow from the upper shield layer to the thin-film magnetic head element through the first nonmagnetic metal layer.

The first nonmagnetic metal layer may have such a thickness that the top surface thereof is flush with that of the thin-film magnetic head element. Alternatively, the first nonmagnetic metal layer may have such a thickness that the position of the top surface thereof is higher than that of the top surface of the thin-film magnetic head element. In addition, the first nonmagnetic metal layer preferably has a larger dimension than the thin-film magnetic head element in a track-width direction. If the first nonmagnetic metal layer is formed with such a large area or thickness, the electrical resistance thereof can be lowered to increase the sense current flowing from the upper shield layer into the first nonmagnetic metal layer. As a result, less current flows in the upper shield layer.

The first and second nonmagnetic metal layers are preferably made of a nonmagnetic metal with lower specific resistance than the upper and lower shield layers. Specifically, the first and second nonmagnetic metal layers preferably include at least one material selected from the group consisting of Au, Ag, Cu, and platinum group metals, and preferably have a specific resistance of 10 μΩcm or less. More preferably, the first and second nonmagnetic metal layers have a specific resistance of 5 μΩcm or less, and are made of Au, Ag, or Cu.

The upper shield layer may include a first upper shield layer segment positioned above the thin-film magnetic head element and a second upper shield layer segment positioned at the rear of the first upper shield layer segment in the height direction. In this case, preferably, the lower shield layer has a contact portion exposed from the insulating layer and electrically connected to the second upper shield layer segment, and the CPP thin-film magnetic head further includes a second insulating layer covering the first nonmagnetic metal layer beside the second upper shield layer segment and the contact portion of the lower shield layer.

The thickness of the insulating layer is preferably larger in the vicinity of the regions thereof in contact with the thin-film magnetic head element and the contact portion than in the other region. In other words, preferably, the thickness of the insulating layer is increased in the vicinity of the regions thereof in contact with the thin-film magnetic head element and the contact portion to reliably prevent leakage current while the thickness is minimized in the other region.

The CPP thin-film magnetic head may further include a third nonmagnetic metal layer between the second upper shield layer segment and the contact portion of the lower shield layer.

Accordingly, the present invention can provide a CPP thin-film magnetic head with higher heat dissipation properties and a lower amount of noise due to the AMR effect by the shield layers to achieve a shorter shield distance.

BRIEF DESCRIPTION OF THE DRAWINGS

FIG. 4 is a partial sectional view showing a step of a method for producing the CPP thin-film magnetic head in FIG. 1 (taken along the center of an element part in a height direction);

FIG. 5A is a partial sectional view showing a step after the step in FIG. 4 (taken along the center of the element part in the height direction);

FIG. 5B is another partial sectional view showing the step after the step in FIG. 4 (from the recording medium side);

FIG. 6 is a partial sectional view showing a step after the step in FIGS. 5A and 5B (taken along the center of the element part in the height direction);

DESCRIPTION OF THE PREFERRED EMBODIMENTS

Figure 1:
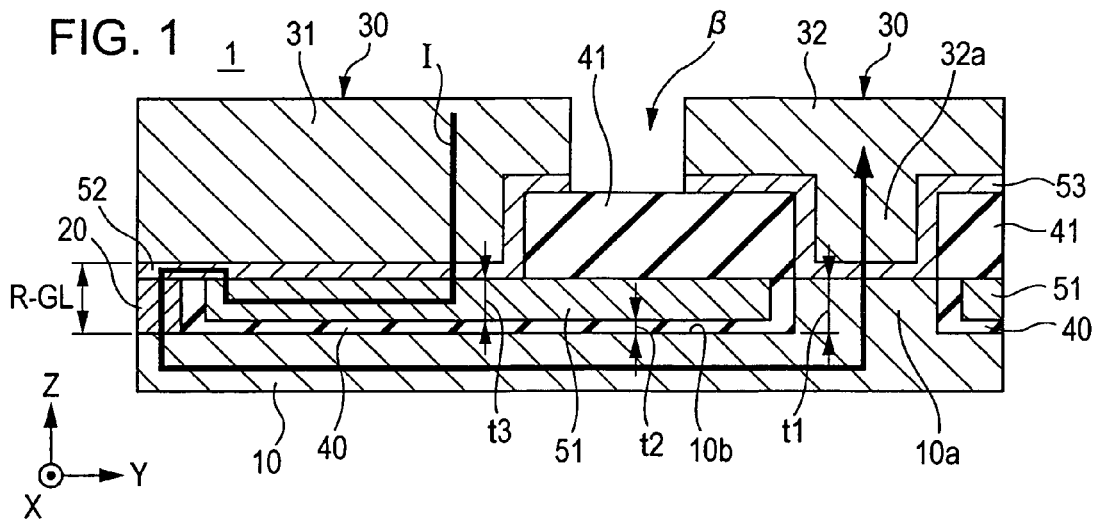
FIG. 1 is a partial sectional view of the structure of a CPP thin-film magnetic head according to a first embodiment of the present invention (taken along the center of an element)

The present invention will now be described with reference to the drawings. In the drawings, the X direction is a track-width direction, the Y direction is a height direction (the direction of leakage magnetic field from a recording medium), and the Z direction is a direction in which the recording medium moves and individual layers constituting a thin-film magnetic head element are laminated.

Figure 2:
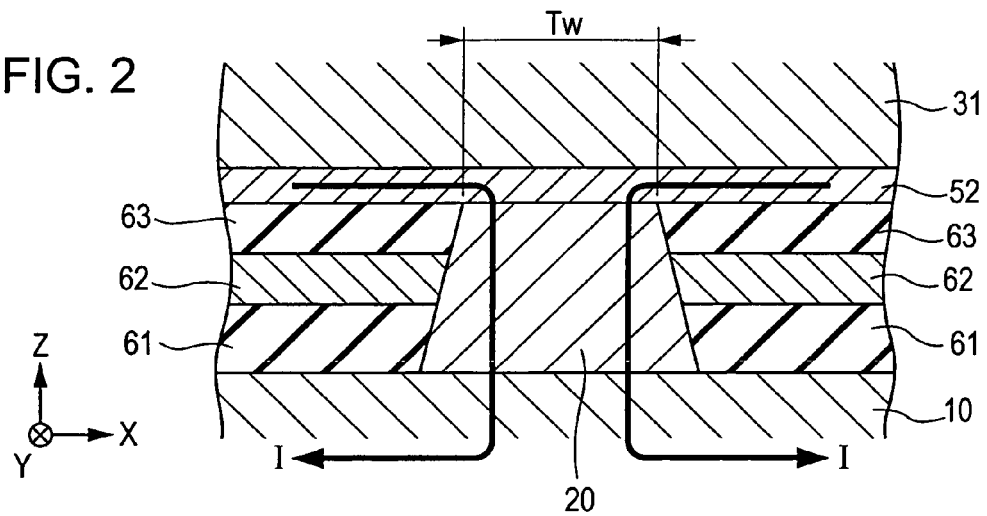
FIG. 2 is a partial sectional view of the structure of the CPP thin-film magnetic head in FIG. 1 from the recording medium side.
Figure 3:
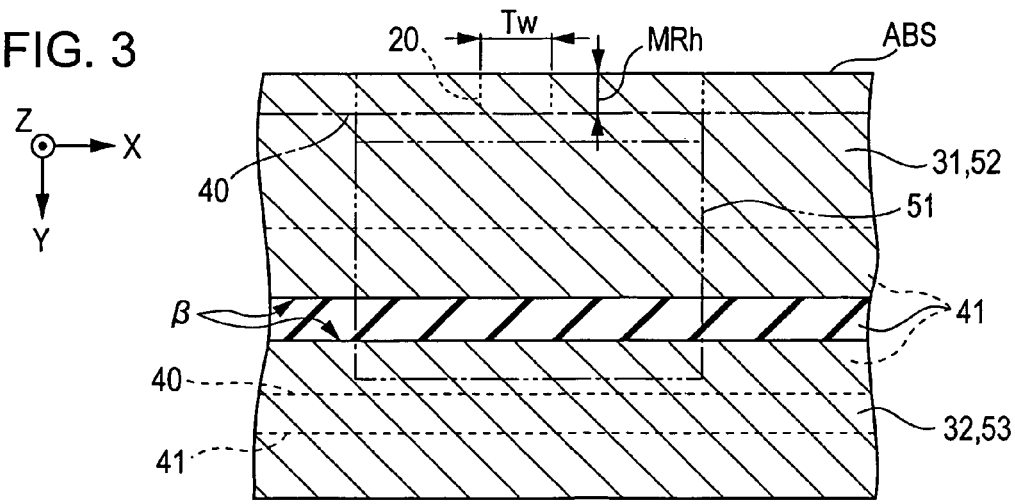
FIG. 3 is a schematic plan view of the CPP thin-film magnetic head from above.

FIGS. 1 to 10 show a CPP thin-film magnetic head according to a first embodiment of the present invention. FIG. 1 is a partial sectional view of the structure of a CPP thin-film magnetic head 1 (taken along the center of an element). FIG. 2 is a partial sectional view of the structure of the CPP thin-film magnetic head 1 from the recording medium side. FIG. 3 is a schematic plan view of the CPP thin-film magnetic head 1 from above.

The CPP thin-film magnetic head 1 includes a lower shield layer 10, an upper shield layer 30 separated from the lower shield layer 10 by a predetermined shield distance R-GL in the Z direction, and a thin-film magnetic head element 20 disposed between the shield layers 10 and 30. When sense current I flows in a direction perpendicular to the surfaces of individual layers constituting the thin-film magnetic head element 20 (in the Z direction), the CPP thin-film magnetic head 1 detects a magnetic field leaking from the recording medium by the magnetoresistance effect of the thin-film magnetic head element 20.

The shield layers 10 and 30 function as both magnetic shields and electrodes for supplying current to the thin-film magnetic head element 20. These layers 10 and 30 are made of a soft magnetic material (for example, NiFe), which has a sufficient magnetic shield effect, and have a thickness of about 1 μm. The upper shield layer 30 is separated into a first upper shield layer segment 31 positioned above the thin-film magnetic head element 20 and a second upper shield layer segment 32 positioned at the rear of the first upper shield layer segment 31 in the height direction. The lower shield layer 10 has a contact portion 10a protruding to the second upper shield layer segment 32, and is electrically connected to the second upper shield layer segment 32 through the contact portion 10a. The top surface of the contact portion 10a is positioned at substantially the same lamination height as that of the thin-film magnetic head element 20. The lower shield layer 10, the first upper shield layer segment 31, and the second upper shield layer segment 32 each have a sufficiently larger area than the thin-film magnetic head element 20 (a track width Tw by a length MRh in the height direction) to produce a sufficient magnetic shield effect.

The thin-film magnetic head element 20 used, as is well known, may be a giant magnetoresistive (GMR) element, which has a giant magnetoresistance effect, or a tunneling magnetoresistive (TMR) element. In FIGS. 2 and 3, the thin-film magnetic head element 20 is positioned substantially in the center of the shield layers 10 and 30 in the X direction. A first insulating layer 61, a hard bias layer 62, and a second insulating layer 63 are laminated in the above order on the lower shield layer 10 at both sides of the thin-film magnetic head element 20 in the X direction. The first and second insulating layers 61 and 63 are made of an insulating material such as $Al_2O_3$ and $SiO_2$, and are formed between the lower shield layer 10 and the hard bias layer 62 and between the hard bias layer 62 and a second nonmagnetic metal layer 52, respectively. The hard bias layer 62 is magnetized in the X direction to apply a longitudinal bias field to a free magnetic layer of the thin-film magnetic head element 20 so that the magnetization of the free magnetic layer is aligned in the X direction. In practice, a bias seed layer (not shown) is formed beneath the hard bias layer 62 to improve its properties (such as coercive force and remanence ratio). In addition, a nonmagnetic metal layer similar to the second nonmagnetic metal layer 52 may be formed between the thin-film magnetic head element 20 and the lower shield layer 10.

A backfill gap layer (insulating layer) 40 made of an insulating material such as $Al_2O_3$ and $SiO_2$ is formed on the lower shield layer 10 at the rear of the thin-film magnetic head element 20 in the height direction. This backfill gap layer 40 covers the exposed surfaces of the thin-film magnetic head element 20 and the lower shield layer 10 other than the top surfaces of the thin-film magnetic head element 20 and the contact portion 10a. The backfill gap layer 40 has a thickness t1, namely about 50 nm, in the vicinity of the regions thereof in contact with the thin-film magnetic head element 20 and the contact portion 10a to reliably prevent leakage current from the thin-film magnetic head element 20 and the contact portion 10a. On the other hand, the backfill gap layer 40 has the minimum thickness t2, namely about 10 nm, required for preventing leakage current in the other region (the intermediate region between the thin-film magnetic head element 20 and the contact portion 10a). The minimized thickness of the backfill gap layer 40 improves the heat dissipation properties while ensuring the insulation between the thin-film magnetic head element 20 and the contact portion 10a.

The backfill gap layer 40 defines a recess region α at the rear of the thin-film magnetic head element 20 in the height direction, and a first nonmagnetic metal layer 51 is provided in the recess region α. The first nonmagnetic metal layer 51 is made of a nonmagnetic metal with lower specific resistance than the shield layers 10 and 30. The first nonmagnetic metal layer 51 has a thickness t3, and the top surface thereof is flush with the top surfaces of the thin-film magnetic head element 20, the backfill gap layer 40, and the contact portion 10a. The first nonmagnetic metal layer 51 has a larger area than the thin-film magnetic head element 20 (the track width Tw by the length MRh in the height direction). The first nonmagnetic metal layer 51 is electrically connected to the first upper shield layer segment 31 through the second nonmagnetic metal layer 52 to function as an electrode together with the first upper shield layer segment 31 and the second nonmagnetic metal layer 52. The second nonmagnetic metal layer 52 is disposed between the first upper shield layer segment 31 and the thin-film magnetic head element 20, the backfill gap layer 40, the first nonmagnetic metal layer 51, and an extra gap layer 41, and has a thickness of about 5 to 10 nm. Similarly to the first nonmagnetic metal layer 51, the second nonmagnetic metal layer 52 is made of a nonmagnetic metal with lower specific resistance than the shield layers 10 and 30. More specifically, the first and second nonmagnetic metal layers 51 and 52 includes at least one of, for example, Au, Ag, Cu, and platinum group metal materials (Pt, Pd, Rh, Ru, Ir, and Os), and has a specific resistance of about 10 μΩcm, preferably about 5 μΩcm. More preferably, the first and second nonmagnetic metal layers 51 and 52 are made of Au, Ag, or Cu. Because of a large area and the thickness t3, as described above, the first nonmagnetic metal layer 51 has lower electrical resistance to allow the sense current I to flow more readily than the second nonmagnetic metal layer 52.

The extra gap layer 41 is an insulating layer made of an insulating material such as $Al_2O_3$ and $SiO_2$, and covers exposed part of the first nonmagnetic metal layer 51 around the contact portion 10a of the lower shield layer 10. This extra gap layer 41 prevents leakage current from the contact portion 10a of the lower shield layer 10 and a contact portion 32a of the second upper shield layer segment 32 to ensure the insulation between the first nonmagnetic metal layer 51 and the lower shield layer 10 and the second upper shield layer segment 32. In this embodiment, the extra gap layer 41 is also formed on the backfill gap layer 40 at the rear of the contact portion 10a of the lower shield layer 10 in the height direction to define the position of the contact portion 32a of the second upper shield layer segment 32. In addition to the first and second nonmagnetic metal layers 51 and 52, a third nonmagnetic metal layer 53 made of a nonmagnetic metal with lower specific resistance than the shield layers 10 and 30 is formed beneath the second upper shield layer segment 32. The lower shield layer 10 and the second upper shield layer segment 32 are electrically connected through the third nonmagnetic metal layer 53.

A sense current path is formed between the first upper shield layer segment 31 and the second upper shield layer segment 32 through the first nonmagnetic metal layer 51, the second nonmagnetic metal layer 52, the thin-film magnetic head element 20, the lower shield layer 10, and the third nonmagnetic metal layer 53. The arrows shown in FIGS. 1 and 2 indicate the current path on which the sense current I flows from the first upper shield layer segment 31 to the second upper shield layer segment 32.

Most of the sense current I supplied to the first upper shield layer segment 31 flows into the second nonmagnetic metal layer 52 and the first nonmagnetic metal layer 51, which have lower specific resistance than the first upper shield layer segment 31. The sense current I then flows in the first nonmagnetic metal layer 51, which has lower electrical resistance than the second nonmagnetic metal layer 52, in parallel with the surface thereof. The sense current I then enters the second nonmagnetic metal layer 52 through the interface between the first and second nonmagnetic metal layers 51 and 52 in the vicinity of the part of the backfill gap layer 40 in contact with the rear end surface of the thin-film magnetic head element 20 in the height direction. The sense current I then flows from the second nonmagnetic metal layer 52 into the thin-film magnetic head element 20 in a direction orthogonal to the surfaces of the individual layers thereof (in the Z direction). Subsequently, the sense current I enters the lower shield layer 10 through the interface between the bottom layer of the thin-film magnetic head element 20 and the lower shield layer 10, flows in the lower shield layer 10 in parallel with the surface thereof, enters the third nonmagnetic metal layer 53, which has lower specific resistance than the lower shield layer 10, through the contact portion 10a, and reaches the second upper shield layer segment 32 through the third nonmagnetic metal layer 53.

According to the above current path, little sense current I flows into the thin-film magnetic head element 20 from the first upper shield layer segment 31 above the thin-film magnetic head element 20. The proportion of the sense current I flowing in the first upper shield layer segment 31 is reduced because most of the sense current I supplied to the first upper shield layer segment 31 flows into the thin-film magnetic head element 20 through the first and second nonmagnetic metal layers 51 and 52. Accordingly, even if the first upper shield layer segment 31 has the AMR effect, noises due to the AMR effect can be inhibited to produce an excellent element output. The same current path is also formed if the sense current I is caused to flow in the reverse direction, namely from the second upper shield layer segment 32 to the first upper shield layer segment 31.

A method for producing the CPP thin-film magnetic head 1 shown in FIGS. 1 to 3 according to an embodiment of the present invention will now be described with reference to FIGS. 4 to 10.

Referring to FIG. 4, the individual layers of the thin-film magnetic head element 20 are laminated on the overall top surface of the lower shield layer 10.

Referring to FIGS. 5A and 5B, a first resist layer R1 for lift-off is formed on the thin-film magnetic head element 20 to define the track width Tw. The portions of the layers of the thin-film magnetic head element 20 that are not covered with the first resist layer R1 are removed by, for example, ion milling or etching to expose the lower shield layer 10 at the removal area. The thin-film magnetic head element 20 remaining after the above step has a substantially trapezoidal shape in cross-section with the track width Tw in the center of the lower shield layer 10 in the X direction. Part of the material removed by ion milling adheres again to the side surfaces of the thin-film magnetic head element 20 in the X direction. This residue is preferably removed again by ion milling. Subsequently, the first insulating layer 61, the hard bias layer 62, and the second insulating layer 63 are successively deposited on both sides of the thin-film magnetic head element 20 in the X direction by sputtering before the first resist layer R1 is removed by lift-off.

Referring to FIG. 6, after the removal of the first resist layer R1, a second resist layer R2 for lift-off is formed on the thin-film magnetic head element 20 and the contact portion 10a of the lower shield layer 10 to define the length MRh in the height direction. The portions of the layers of the thin-film magnetic head element 20 and the lower shield layer 10 that are not covered with the second resist layer R2 are removed by, for example, ion milling or etching to expose the lower shield layer 10 at the rear of the thin-film magnetic head element 20 in the height direction.

Figure 7:
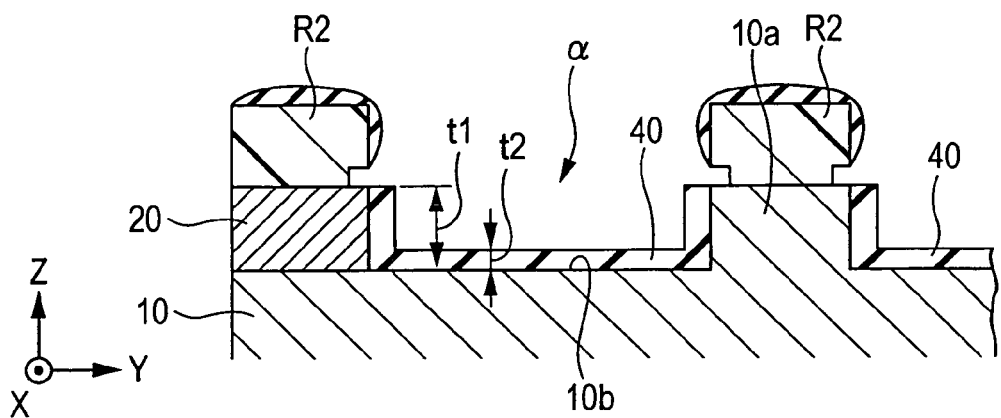
FIG. 7 is a partial sectional view showing a step after the step in FIG. 6 (taken along the center of the element part in the height direction)

Referring to FIG. 7, a backfill gap layer 40 is formed to cover the surfaces of the thin-film magnetic head element 20 and the lower shield layer 10 that are exposed from the second resist layer R2, namely the rear end surface of the thin-film magnetic head element 20 in the height direction and the top surface of the lower shield layer 10 other than that of the contact portion 10a. The backfill gap layer 40 is made of an insulating material such as $Al_2O_3$ and $SiO_2$. The thickness t1 of the backfill gap layer 40 in the vicinity of the regions thereof in contact with the thin-film magnetic head element 20 and the contact portion 10a is about 50 nm, and the thickness t2 of the backfill gap layer 40 in the intermediate region between the thin-film magnetic head element 20 and the contact portion 10a is about 10 nm. This backfill gap layer 40 defines the recess region α between the rear end surface of the thin-film magnetic head element 20 in the height direction and the contact portion 10a of the lower shield layer 10.

Figure 8:
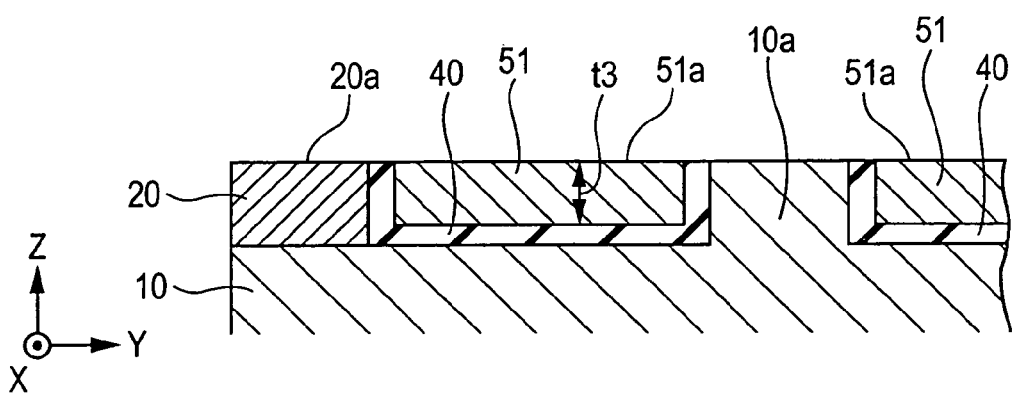
FIG. 8 is a partial sectional view showing a step after the step in FIG. 7 (taken along the center of the element part in the height direction)

Subsequently, the first nonmagnetic metal layer 51 is deposited in the recess region α defined by the backfill gap layer 40 by sputtering with the second resist layer R2 being left. This first nonmagnetic metal layer 51 is made of a nonmagnetic metal with lower specific resistance than the shield layers 10 and 30. More specifically, the first nonmagnetic metal layer 51 includes at least one of, for example, Au, Ag, Cu, and platinum group metal materials (Pt, Pd, Rh, Ru, Ir, and Os), and has a specific resistance of about 10 μΩcm. More preferably, the first nonmagnetic metal layer 51 has a specific resistance of about 5 μΩcm, and is made of Au, Ag, or Cu. Referring to FIG. 8, in this embodiment, the first nonmagnetic metal layer 51 has the thickness t3, and the top surface 51a thereof is flush with the top surface 20a of the thin-film magnetic head element 20. After the first nonmagnetic metal layer 51 is deposited, the second resist layer R2 is removed by lift-off.

Figure 9:
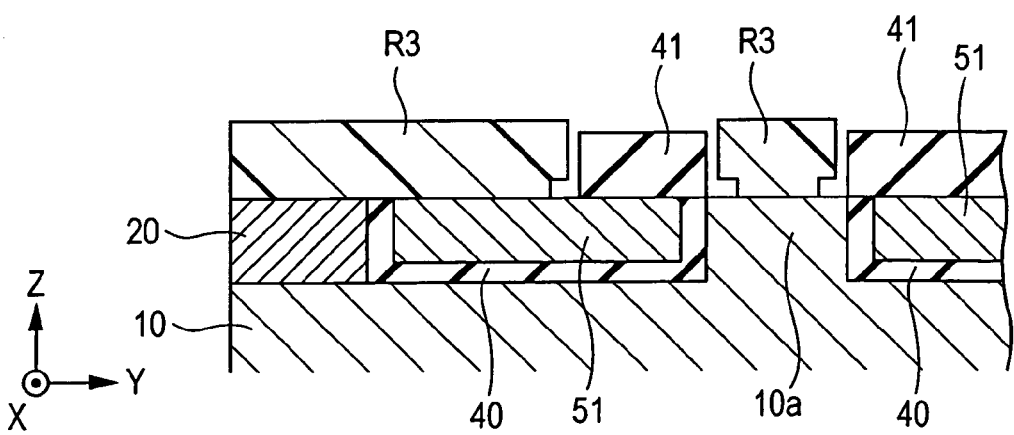
FIG. 9 is a partial sectional view showing a step after the step in FIG. 8 (taken along the center of the element part in the height direction)

Referring to FIG. 9, a third resist layer R3 for lift-off is formed, which has space for the extra gap layer 41. The extra gap layer 41 is formed on the parts of the first nonmagnetic metal layer 51 and the backfill gap layer 40 that are not covered with the third resist layer R3. After the extra gap layer 41 is formed, the third resist layer R3 is removed by lift-off. The extra gap layer 41 covers the exposed surface of the first nonmagnetic metal layer 51 around the contact portion 10a to form a recess for the contact portion 32a of the second upper shield layer segment 32 on the contact portion 10a.

Figure 10:
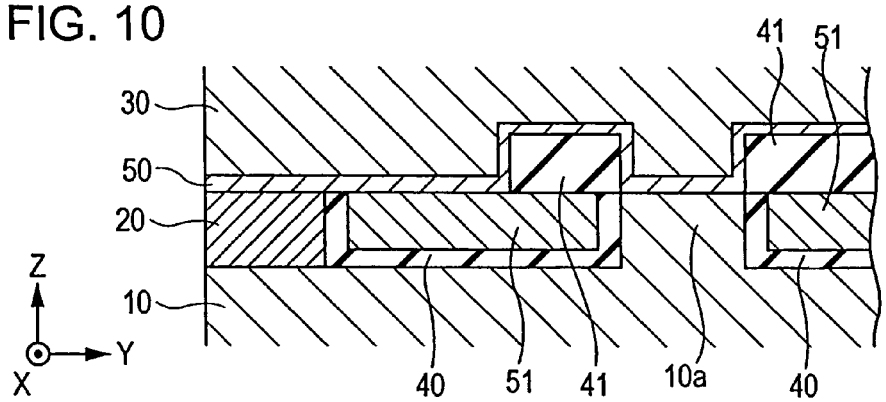
FIG. 10 is a partial sectional view showing a step after the step in FIG. 9 (taken along the center of the element part in the height direction)

Subsequently, surface oxide layers are removed by, for example, etching from the exposed surfaces of the thin-film magnetic head element 20, the backfill gap layer 40, the first nonmagnetic metal layer 51, the extra gap layer 41, and the contact portion 10a of the lower shield layer 10. Referring to FIG. 10, a nonmagnetic metal layer 50 and the upper shield layer 30 are laminated on the above layers. Similarly to the first nonmagnetic metal layer 51, the nonmagnetic metal layer 50 is made of a nonmagnetic metal with lower specific resistance than the shield layers 10 and 30. More specifically, the nonmagnetic metal layer 50 includes at least one of, for example, Au, Ag, Cu, and platinum group metal materials (Pt, Pd, Rh, Ru, Ir, and Os), and has a specific resistance of about 10 μΩcm. More preferably, the nonmagnetic metal layer 50 has a specific resistance of about 5 μΩcm, and is made of Au, Ag, or Cu.

After the upper shield layer 30 is formed, an opening β (see FIG. 1) is formed to expose the surface of the extra gap layer 41 above the first nonmagnetic metal layer 51. This opening β separates the upper shield layer 30 into the first upper shield layer segment 31, which is electrically connected to the thin-film magnetic head element 20, and the second upper shield layer segment 32, which is electrically connected to the contact portion 10a of the lower shield layer 10. In addition, the opening β separates the nonmagnetic metal layer 50 into the second nonmagnetic metal layer 52, which is positioned beneath the first upper shield layer segment 31, and the third nonmagnetic metal layer 53, which is positioned beneath the second upper shield layer segment 32.

After the above steps, the CPP thin-film magnetic head 1 shown in FIGS. 1 to 3 is produced.

Figure 11:
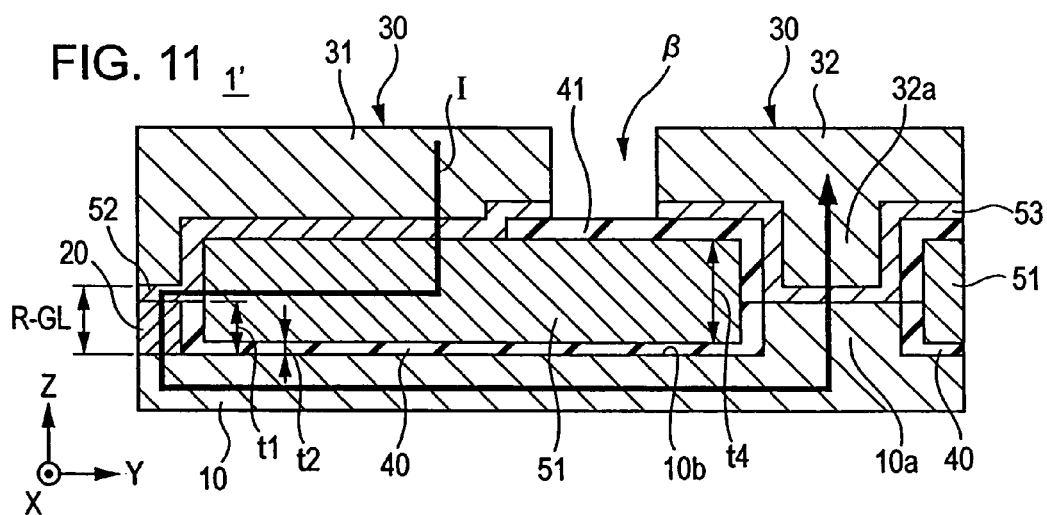
FIG. 11 is a partial sectional view of the structure of a CPP thin-film magnetic head according to a second embodiment of the present invention (taken along the center of an element in a height direction)
Figure 12:
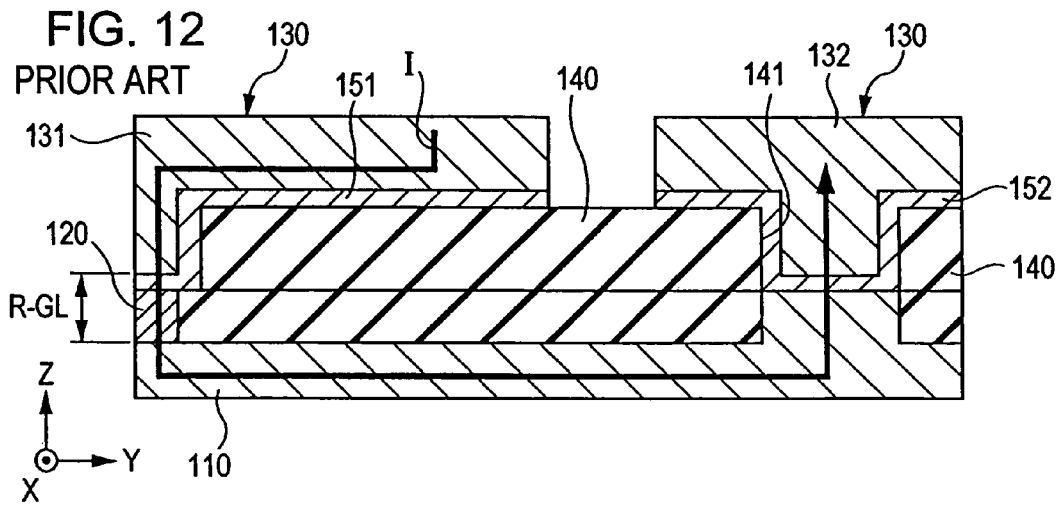
FIG. 12 is a sectional view of the structure of a known CPP thin-film magnetic head (taken along the center of an element).

FIG. 11 is a partial sectional view of the structure of a CPP thin-film magnetic head 1' according to a second embodiment of the present invention (taken along the center of an element). The CPP thin-film magnetic head 1' according to the second embodiment differs from that according to the first embodiment in that the thickness t4 of the first nonmagnetic metal layer 51 in the second embodiment is larger than that in the first embodiment (the thickness t4 is larger than the thickness t1). Except for the above difference, the CPP thin-film magnetic head 1' according to the second embodiment has the same structure as the CPP thin-film magnetic head 1 according to the first embodiment. The CPP thin-film magnetic head 1' can therefore be produced by changing the thickness of the first nonmagnetic metal layer 51 in the above process of producing the CPP thin-film magnetic head 1 according to the first embodiment. According to the second embodiment, the electrical resistance of the first nonmagnetic metal layer 51 can be further reduced to increase the sense current I flowing from the first upper shield layer segment 31 into the first nonmagnetic metal layer 51. This allows a further reduction in noise due to the AMR effect of the first upper shield layer segment 31.

The CPP-GMR heads according to the above embodiments may be applied not only to playback thin-film magnetic heads, but also to recording/playback thin-film magnetic heads, which include a playback thin-film magnetic head and a recording inductive head formed thereon.

What is claimed is:

1. A CPP thin-film magnetic head comprising:
   a lower shield layer;
   an upper shield layer separated from the lower shield layer by a predetermined distance;
   a thin-film magnetic head element disposed between the lower and upper shield layers, the thin-film magnetic head element allowing current to flow in a direction orthogonal to a surface thereof;
   an insulating layer positioned at a rear of the thin-film magnetic head element in a height direction, the insulating layer covering the thin-film magnetic head element and the lower shield layer;
   a first nonmagnetic metal layer provided in a region defined by the insulating layer; and
   a second nonmagnetic metal layer disposed between the upper shield layer and each of the first nonmagnetic metal layer, the insulating layer, and the thin-film magnetic head element; and, the second nonmagnetic metal layer is electrically connected to the upper shield layer allowing current to flow from the upper shield layer to the thin-film magnetic head element through the first nonmagnetic metal layer.

2. The CPP thin-film magnetic head according to claim 1, wherein the first nonmagnetic metal layer has such a thickness that a top surface thereof is flush with that of the thin-film magnetic head element.

3. The CPP thin-film magnetic head according to claim 1, wherein the first nonmagnetic metal layer has such a thickness that a position of the top surface thereof is higher than that of a top surface of the thin-film magnetic head element.

4. The CPP thin-film magnetic head according to claim 1, wherein the first nonmagnetic metal layer has a larger dimension than the thin-film magnetic head element in a trackwidth direction.

5. The CPP thin-film magnetic head according to claim 1, wherein the first and second nonmagnetic metal layers comprise at least one material selected from the group consisting of Au, Ag, Cu, and platinum group metals.

6. The CPP thin-film magnetic head according to claim 5, wherein the first and second nonmagnetic metal layers have a specific resistance of 10 µΩcm or less.

7. The CPP thin-film magnetic head according to claim 5, wherein the first and second nonmagnetic metal layers have a specific resistance of 5 µΩcm or less.

8. The CPP thin-film magnetic head according to claim 5, wherein the first and second nonmagnetic metal layers comprise Au, Ag, or Cu.

9. The CPP thin-film magnetic head according to claim 1, wherein
   the upper shield layer includes a first upper shield layer segment positioned above the thin-film magnetic head element and a second upper shield layer segment positioned at a rear of the first upper shield layer segment in a height direction; and
   the lower shield layer has a contact portion exposed from the insulating layer and electrically connected to the second upper shield layer segment,
   the CPP thin-film magnetic head further comprising a second insulating layer covering the first nonmagnetic metal layer beside the second upper shield layer segment and the contact portion of the lower shield layer.

10. The CPP thin-film magnetic head according to claim 9, wherein a thickness of the insulating layer is larger in the vicinity of a region thereof in contact with the thin-film magnetic head element and the contact portion than in an other region.

11. The CPP thin-film magnetic head according to claim 9, further comprising a third nonmagnetic metal layer between the second upper shield layer segment and the contact portion of the lower shield layer.

* * * * *